June 6, 1944.    J. L. ACORD    2,350,952
METHOD OF FABRICATING TORCH TIPS
Filed Dec. 1, 1943
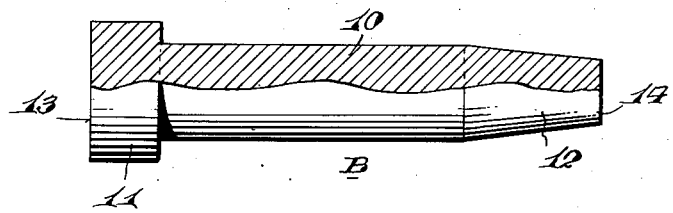
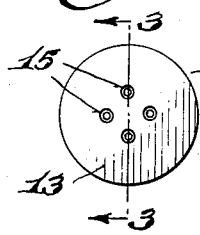 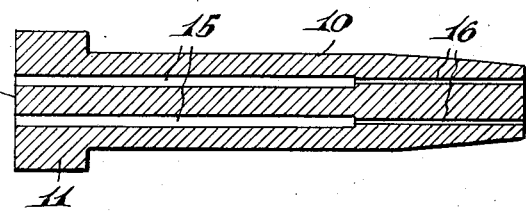 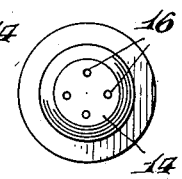
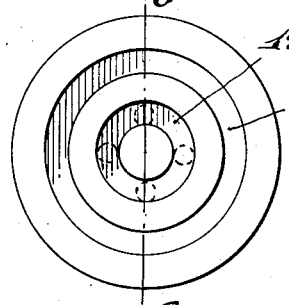 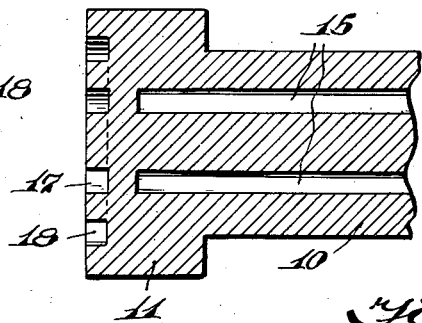
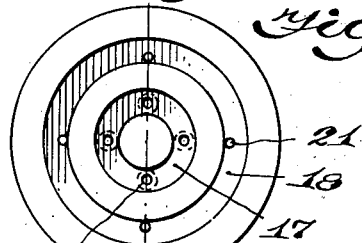 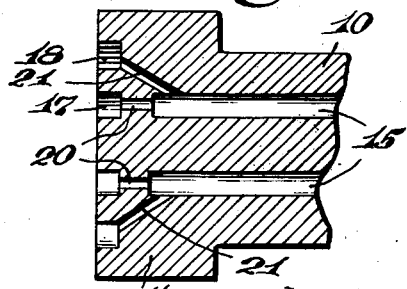
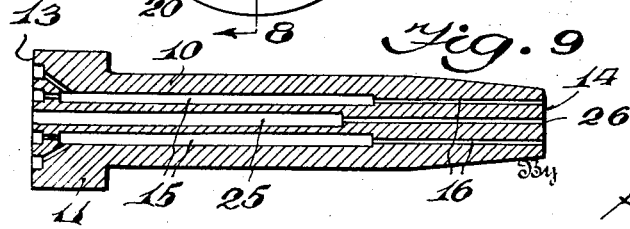
Inventor
John L. Acord,
Samuel Selowitz
Attorney Patented June 6, 1944

2,350,952

UNITED STATES PATENT OFFICE 2,350,952

METHOD OF FABRICATING TORCH TIPS

John L. Acord, Baltimore, Md., assignor of one-half to James H. Levi, Baltimore, Md.

Application December 1, 1943, Serial No. 512,505

9 Claims. (Cl. 29—157)

This invention relates to a method of fabricating tips for torches employed in the cutting or welding of metals.

It is the object of the present invention to simplify the production of blow torch tips in order to obtain one characterized by comparatively long life as a result of the elimination of working stresses upon the metal forming the tip in the course of fabrication.

It is a further object of the present invention to provide a unitary torch tip which is formed from a single piece of metal by the execution of a minimum number of manipulative steps requiring minimum working of the metal, auxiliary mandrels or supplemental inserts which have been incorporated heretofore into the tip structure in united assembly therewith, to realize economies in time and cost entailed in the fabrication of these tips while attaining one which remains in operation for a longer period of time than those produced by the methods of the prior art, in consequence of the deteriorative influences of the high temperature environments in which such tips are employed.

The invention proceeds upon the principle of fabricating the tip from a high grade copper bar-stock which is turned initially on a lathe into the general configuration of the finished tip having a shoulder at one end and a taper at the other end. A plurality of passages for the gaseous fuel and oxygen heating mixture are bored at a plurality of points which are equidistantly displaced around the longitudinal axis of the tip, these passages being of reduced diameter adjacent the tapered end of the tip and of enlarged diameter adjacent the shouldered end of the tip whereat the gaseous constituents are mixed, meeting at an intermediate part of the tip by virtue of the coaxial alignment of the drills which execute the boring operations from the opposite ends of the tip. In order to obtain an effective intermixture of the oxygen with the gaseous fuels such as acetylene, the passages terminating in the shouldered end must be of enlarged cross-section; nevertheless, a controlled amount of the constituents of the mixture must be supplied each of these passages, and for this reason the size of the inlets to these passages must be reduced from that characterizing the main cross-sections thereof. Therefore, a single swaging step at the shouldered end of the tip is executed for the purpose of closing off entirely, for a short distance, the ends of the enlarged passages at that end, which closed ends are adapted to be drilled subsequently to provide constricted communicating passages for the entry of the required amount of oxygen to the mixing chambers for the fuel and oxygen. In the case of fabricating tips of the type requiring circular depressions in the end surface, which are designed to cooperate with the inlet sources for the gaseous oxygen and fuel in the body of the torch, in which the tip may be seated, such depressions are formed in the end face of the shouldered end of the tip incidental to the single swaging step. Thereupon, the openings of desired sizes are bored through the rear end of the tip by the insertion of the necessary drills through the passages extending to the front tapered end of the tip. These openings of reduced diameter at the rear of the tip provide index points for the drilling of inclined passages extending from the end surface or outer circular depression communicating with the source of fuel to the passages in which the intermixture of oxygen and fuel are to take place. If the tip is to be used for cutting purposes, passages for the cutting oxygen are bored in the front and rear of the tip centrally thereof; if the tip is to be used for welding only, these cutting passages are not necessary. The tip may be finished by machining the shouldered end face if such is necessary.

By extending the heating passages rearwardly from the tapered end of the tip, the life of the tip is extended substantially before the same is disintegrated to the extent that the same is no longer useful.

Other objects and purposes will appear from the following more detailed description of the invention, taken in conjunction with the accompanying drawing, wherein Fig. 1 is a front elevation of the tip with part thereof in section, showing its initial contour resulting from the turning thereof on a lathe;

Fig. 2 is a left end view of the tip following the drilling of the preheating passages therein from its opposite ends;

Fig. 3 is a vertical sectional view along line 3—3 of Fig. 2;

Fig. 4 is a right hand view of Fig. 3;

Fig. 5 is a left hand view of the tip following the swaging operation executed upon the shouldered end in which operation the passages of enlarged diameter opening into that end are sealed off while two circular depressions are formed therein;

Fig. 6 is a vertical sectional view along line 6—6 of Fig. 5 showing the tip in this stage of manufacture;

Fig. 7 is a left hand view of the tip shown in Fig. 6 following the boring of passages of reduced diameter into the shouldered end by means of drills inserted through the passages of reduced diameter opening into the forward end and following the boring of the inclined passages communicating from the outer circular depression to the passages of enlarged diameter;

Fig. 8 is a vertical sectional view along line 8—8 of Fig. 7; and

Fig. 9 is a vertical sectional view of the completed tip following the boring of the oxygen cutting passages therein.

In Fig. 1 is shown the tip B formed of the cylindrical central body 10 having the shoulder 11 at one end thereof and the taper 12 at the other end thereof, which may be turned upon any suitable lathe from copper bar-stock or any other suitably ductile metal which may be used in the art. The end face at the shoulder 11 is designated 13 and the end face at the extremity of the taper portion 12 is designated 14. The tip may be fabricated in various sizes and one approximating 2⅝" in length is illustrative, turned from a piece of ¾" stock. A plurality of passages are drilled into the opposite ends of the tip through faces 13 and 14 at equidistantly disposed points around the longitudinal axis of the tip. The drawing shows the boring of four of such passages 15 of enlarged diameter and four passages 16 of reduced diameter which meet at an intermediate portion of the tip as a result of the coaxial alignment of these drills on the machine on which these boring steps are executed. A #63 drill may be used for passages 16, and a ⅟₁₆" drill for pasages 15. Any number of passages may be formed, such as 5, 6 or more, depending upon the functions to be performed with the tip and the fuels used therewith.

Thereupon the shouldered end 11 of the tip is swaged at the portion 11 to seal off the passages 15 at the rear end of the tip to render the metal homogeneous at this portion of the tip. For the fabrication of the tips of the type shown in the drawing, the swaging operation also forms two concentric circular depressions 17 and 18 in the end face 13, the former disposed in the locus of the axes of the passages 15 and 16. In the manufacture of other types of tips, the end surface 13 may be plane or of any desired configuration. The tip at this stage of the process is illustrated in Figs. 5 and 6. Thereupon, drills of suitable diameter are introduced through the passages 16 for the purpose of forming communicating passages 20 between the closed passages 15 and the inner circular depression 17. These may be of the same or reduced size relative to passages 16. The passages 20 at the base of the circular depression 17 provide index points for the insertion of drills of suitable size, for example #65, to bore passages 21 between the outer circular depression 18 and the passages 15. The connections 21 between the circular depression 18, which communicates with the source of fuel in the torch in which the tip B is fitted, and the passages 15 are preferably so directed that the passages 21 intersect the passages 15 at the enlarged diameters thereof, as shown in Fig. 8. However, it is possible to arrange that the passages 21 open into the bridging passages 20 of reduced diameter.

If the tip is to be used for cutting purposes, the oxygen cutting passage 25 of enlarged diameter is bored from the end 13 of the tip while the passage 26 is bored from the end 14 of the tip. These boring operations may be executed with #27 and #52 drills. Of course, these passages are coaxially arranged centrally of the tip.

The tip may be finished by facing the end 13 so that the same may fit with nicety in the receptacle therefor provided in the blowtorch body.

While I have described my invention as embodied in specific form and as operating in a specific manner for purposes of illustration, it should be understood that I do not limit my invention thereto, since various modifications will suggest themselves to those skilled in the art without departing from the spirit of my invention, the scope of which is set forth in the annexed claims.

I claim:

1. The method of fabricating a unitary tip for a torch which comprises turning a piece of metallic bar-stock with an enlarged shoulder at one end thereof and a taper at the other end thereof, drilling a plurality of passages of enlarged diameter at a plurality of angularly equidistant points around the longitudinal axis of the piece in the shouldered end of the piece and simultaneously drilling a plurality of passages of reduced diameter in the opposite end of the piece in axial alignment with said passages of enlarged diameter with the respective passages meeting at an intermediate part of the piece; swaging the shouldered end of the piece to close off the passages of enlarged diameter at said end and simultaneously forming in the end surface of the piece a pair of concentric circular depressions, the inner one corresponding to the locus of the transverse sections of the plurality of passages of reduced diameter, drilling communicating passages of reduced diameter between the closed ends of said first-mentioned passages and the inner circular depression by drilling through the passages of reduced diameter in the end surface at the tapered end of the piece, and drilling an inclined passage from the outer circular depression to each passage communicating with the inner circular depression.

2. The method of fabricating a unitary tip for a torch which comprises turning a piece of metallic bar-stock with an enlarged shoulder at one end thereof and a taper at the other end thereof, drilling a plurality of passages of enlarged diameter at a plurality of angularly equidistant points around the longitudinal axis of the piece in the shouldered end of the piece and simultaneously drilling a plurality of passages of reduced diameter in the opposite end of the piece in axial alignment with said passages of enlarged diameter with the respective passages meeting at an intermediate part of the piece; swaging the shouldered end of the piece to close off the passages of enlarged diameter at said end and simultaneously forming in the end surface of the piece a pair of concentric circular depressions, the inner one corresponding to the locus of the transverse sections of the plurality of passages of reduced diameter, drilling communicating passages of reduced diameter between the closed ends of said first-mentioned passages and the inner circular depression by drilling through the passages of reduced diameter in the end surface at the tapered end of the piece, drilling an inclined passage from the outer circular depression to each passage communicating with the inner circular depression, and boring an oxygen cutting passage through the axial center of the piece having an enlarged diameter through the portion adjacent the shouldered end of the piece and a reduced diameter through the portion provided with the taper.

3. The method of fabricating a unitary tip for a torch which comprises turning a piece of copper bar-stock with an enlarged shoulder at one end thereof and a taper at the other end thereof, drilling a plurality of passages of enlarged diameter at a plurality of angularly equidistant points around the longitudinal axis of the piece in the shouldered end of the piece and simultaneously drilling a plurality of passages of reduced diameter in the opposite end of the piece in axial alignment with said passages of enlarged diameter with the respective passages meeting at an intermediate part of the piece; swaging the shouldered end of the piece to close off the passages of enlarged diameter at said end and simultaneously forming in the end surface of the piece a pair of concentric circular depressions, the inner one corresponding to the locus of the transverse sections of the plurality of passages of reduced diameter, drilling communicating passages of reduced diameter between the closed ends of said first-mentioned passages and the inner circular depression by drilling through the passages of reduced diameter in the end surface at the tapered end of the piece, drilling an inclined passage of small diameter from a point in the outer circular depression adjacent each opening in the inner circular depression to the respective passage communicating with the inner circular depression and intersecting said last-mentioned passage at the enlarged cross-section thereof and boring an oxygen cutting passage through the axial center of the piece having an enlarged diameter through the portion adjacent the shouldered end of the piece and a reduced diameter through the portion provided with the taper.

4. The method of fabricating a unitary tip for a torch which comprises turning a piece of copper bar-stock with an enlarged shoulder at one end thereof and a taper at the other end thereof, drilling a plurality of passages of enlarged diameter at a plurality of angularly equidistant points around the longitudinal axis of the tip in the shouldered end of the tip and simultaneously drilling a plurality of passages of reduced diameter in the opposite end of the tip in axial alignment with said passages of enlarged diameter with the respective passages meeting at an intermediate part of the tip; swaging the shouldered end of the tip to close off the passages of enlarged diameter at said end and simultaneously forming in the end surface of the tip a pair of concentric circular depressions, the inner one corresponding to the locus of the transverse sections of the plurality of passages of reduced diameter, drilling communicating passages of reduced diameter between the closed ends of said first-mentioned passages and the inner circular depression by drilling through the passages of reduced diameter in the end surface at the tapered end of the tip, drilling an inclined passage from the outer circular depression to each passage communicating with the inner circular depression, boring a passage of enlarged diameter through the axial center of the tip from the shouldered end thereof and boring a passage of reduced diameter from the opposite end thereof in axial alignment with the passages meeting at an intermediate part of the tip, and facing the enlarged shouldered end of the tip.

5. The steps in the method of fabricating a unitary tip for a torch which comprises drilling a plurality of passages of enlarged diameter at a plurality of angularly equidistant points around the longitudinal axis of the tip in one end thereof and simultaneously drilling a plurality of passages of reduced diameter in the opposite end thereof in axial alignment with said passages of enlarged diameter, swaging the first end of the tip to close off the passages of enlarged diameter at said end, and opening said first-mentioned passages by drilling through the swaged end of the tip from the end having the passages of reduced diameter therein.

6. The steps in the method of fabricating a unitary tip for a torch which comprises turning a piece of metallic bar stock into a substantially cylindrical configuration, drilling a plurality of passages of enlarged diameter at a plurality of angularly equidistant points around the longitudinal axis of the tip in one end thereof and simultaneously drilling a plurality of passages of reduced diameter in the opposite end thereof in axial alignment with said passages of enlarged diameter; swaging the first-mentioned end of the piece to close off the passages of enlarged diameter at said end, drilling passages of reduced diameter through said first-mentioned end of the piece and said first-mentioned passages by inserting drills through the opposite end of the piece, and drilling inclined passages from said first-mentioned end of the piece to the passages opening thereinto.

7. The steps in the method of fabricating a unitary tip for a torch which comprises drilling a plurality of passages of enlarged diameter at a plurality of angularly equidistant points around the longitudinal axis of the tip in one end thereof and simultaneously drilling a plurality of passages of reduced diameter in the opposite end thereof in axial alignment with said passages of enlarged diameter with the respective passages meeting at an intermediate part of the tip; swaging the first end of the tip to close off the passages of enlarged diameter at said end, drilling passages of reduced diameter through said first-mentioned end of the tip and said first-mentioned passages by drilling through the passages of reduced diameter in the opposite end of the tip, and drilling an inclined passage from said first-mentioned end of the tip to each passage opening thereinto.

8. The steps in the method of fabricating a unitary tip for a torch which comprises drilling a plurality of passages of enlarged diameter at a plurality of angularly equidistant points around the longitudinal axis of the tip in one end thereof and simultaneously drilling a plurality of passages of reduced diameter in the opposite end thereof in axial alignment with said passages of enlarged diameter with the respective passages meeting at an intermediate part of the tip; swaging the first end of the tip to close off the passages of enlarged diameter at said end, drilling passages of reduced diameter through said first-mentioned end of the tip and said first-mentioned passages by drilling through the passages of reduced diameter in the opposite end of the tip, drilling an inclined passage from said first-mentioned end of the tip to each passage opening thereinto, and boring an oxygen cutting passage through the axial center of the tip.

9. The steps in the method of fabricating a unitary tip for a torch which comprises forming a plurality of passages of enlarged diameter at a plurality of angularly equidistant points around the longitudinal axis of the tip in one end thereof and forming a plurality of passages of reduced diameter in the opposite end thereof in axial alignment with said passages of enlarged diameter, swaging the first end of the tip to close off the passages of enlarged diameter at said end, and opening said first-mentioned passages by drilling through the swaged end of the tip from the end having the passages of reduced diameter therein.

JOHN L. ACORD.